May 21, 1963 M. W. MAY 3,090,615
MASONRY BUTT GAUGE
Filed Nov. 14, 1960
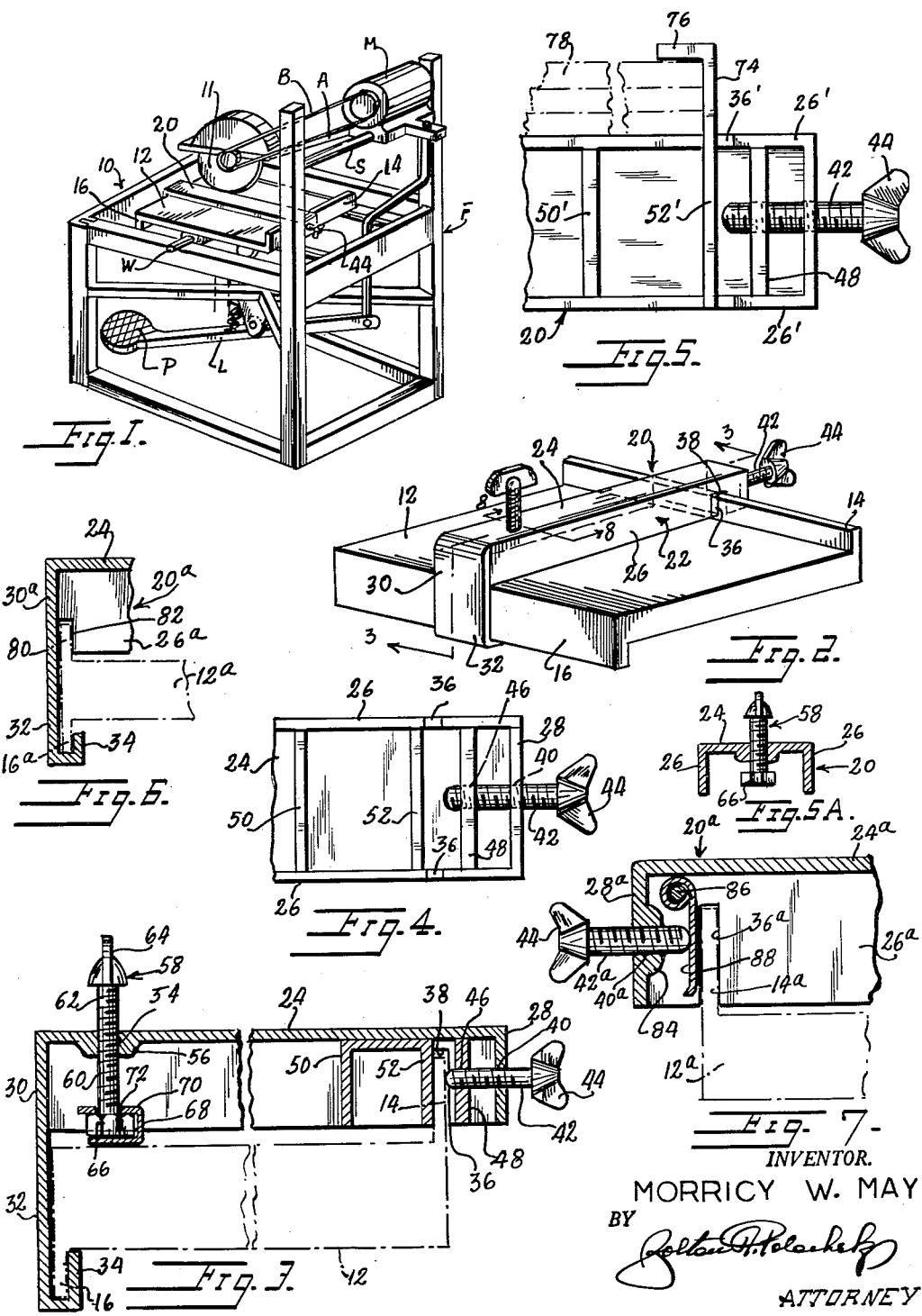
INVENTOR.
MORRICY W. MAY
BY
ATTORNEY

United States Patent Office 3,090,615
Patented May 21, 1963

3,090,615
MASONRY BUTT GAUGE
Morricy W. May, 26 Van Dyke Road,
East Longmeadow, Mass.
Filed Nov. 14, 1960, Ser. No. 68,835
2 Claims. (Cl. 269—305)

This invention relates to cutting machines and particularly to improved work guides or gauges and work supporting tables of cutting machines or cutting devices.

Some of the gauges of this type presently in use with which applicant is aware are flimsy and cannot be set to provide a fixed accurate alignment. This is not only true in machines for cutting wood stock with a saw wheel, but also in machines for cutting bricks and tiles with emery wheels. Machines utilizing emery cutters do not use gauges that are highly precise elements as the cost would be prohibitive in the trade, and its life as a precise device would be short. A device of this type must be rugged and adapted to be set with comparative accuracy which will remain in its set position until changed by the operator.

An object of this invention is to provide a work gauge for cutting machines which is inexpensive and rugged.

Another object of this invention is to provide a work gauge for a table of a cutting machine which attaches to the table at both its ends.

Another object is to provide the aforementioned gauge which is positioned with facility and comparative accuracy, and may be locked when set to maintain its set position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a cutting machine having a table and work gauge constructed according to the invention.

FIG. 2 is a perspective view of the table and gauge of FIG. 1 drawn on a larger scale.

FIG. 3 is a sectional view of the ends of a gauge taken on line 3—3 of FIG. 2.

FIG. 4 is a bottom plan view of the right-hand end of the gauge of FIG. 3.

FIG. 5 is a similar view of a modified gauge end.

FIG. 5A is a sectional view taken on the line 5A—5A of FIG. 2.

FIGS. 6 and 7 are sectional views of further modifications of the same gauge end.

Referring to the drawings and specifically to FIG. 1, a cutting machine 10 is shown comprised of a framework F having a pair of tracks T running from front to rear. A cutting table 12 has a trolley (not shown) that rides on the tracks T to permit fore and aft movement thereof. A wheel and worm W may be included to shift the table 12 sideways on the trolley. A cutter 11 is rotatably mounted on one end of a base arm A pivotally mounted on the machine 10 on a shaft S. A motor M is mounted at the connected end of arm A and drives the cutter 11 by a belt B. The arm A is pivoted on shaft S by a pedal P through linkage L to move the cutter 11 towards and away from the table 12 that supports the work, such as a tile block, a cinder block and the like. The table 12 comprises a flat rectangular plate having an upwardly extending flange 14 at the rear side thereof as viewed in FIG. 1 and a downwardly extending flange 16 at the front side.

In accordance with the present invention, the work is properly positioned relative to the cutter 11 by means of a gauge 20. The gauge 20 has an elongated channel or inverted U-shaped body 22 of steel with flat top 24 and sides 26 closed at one end by a wall 28 and closed at the other end by a wall 30 formed with a downward extension 32 as viewed in FIG. 2. The extension 32 terminates in an upturned hook 34. At one end, and closely spaced from the end wall 28, the side walls of the gauge are formed with aligned slots 36 intersecting the edges of the sides and formed with flat bases 38 to receive the flat top edge of the flange 14. The end wall 28 is formed with a threaded central opening 40 to receive a threaded bolt 42 provided with a wing knob 44. The bolt 42 extends through a threaded opening 46 in a partition wall 48 closely spaced inwardly from the end wall 28 inside the body of the gauge. The wall is welded or otherwise suitably fastened to the top and sides of the gauge body. An inverted U-shaped member 50 is fitted between the sides of the gauge body with its bight portion welded to the top 24 of the gauge body. One leg 52 of the member 50 is aligned with one edge wall of the slots 36, thereby providing a bearing surface for the flange 14 preventing damage thereto by the edge walls of the slots.

At the other end and closely spaced from the end wall 30, the body of the gauge is formed with a threaded opening 54 in the top 24, the top being enlarged on the inside around the opening as indicated at 56. A bolt 58 having a shank 60 threaded at one end 62 and formed with a wing knob 64 at the extremity of said end extends through the opening 54. The other end of the shank inside the body of the gauge carries a nut 66. A C-shaped member 68 is preferably sleeved around the nut 66, one leg 70 of the C-shaped member having an opening 72 to receive the shank of the bolt.

In use, the table 12 is supported on the framework F with the upstanding flange 14 at the rear and the downwardly extending flange at the front of the machine. The gauge 20 is placed on the top of the table with the slotted end embracing the flange 14. The height of the flange 14 is greater than the depth of the slots 36 so that said end of the gauge is raised off of the surface of the table 12. The other end of the gauge is hooked around the flange 16 by means of the hook 34. The bolt 42 is set up against the flange 14 thereby clamping the slotted end of the gauge in position against the table 12, and the bolt 58 is set up pressing the C-shaped member 68 against the top surface of the table 12 thereby protecting the surface from the nut 66 and thereby raising said end of the gauge off of the table surface and drawing the hook 34 upwardly into interlocking position with the flange 16.

By loosening the bolts 42 and 58, the gauge may be slid along the table 12 toward or away from the cutter 11 in order to properly position the work relative to the cutter.

In FIG. 5, the slotted end of the gauge 20 is shown modified to the extent that the leg 52' of the inverted U-shaped member 50' extends outwardly through the slot 36' in one of the sides 26' of the gauge body forming an extension 74 provided with a flange 76 at the outer extremity thereof. The extension 74 serves as an abutment for the ends of spacers 78 juxtaposed along one of the sides 26' of the gauge and fitted between said side and the flange 76. The spacers may be of the same or different lengths and/or widths for changing the spacing between the gauge 20 and the cutter 11. The spacers also provide a variable reference surface so that one piece of the work can be cut at one length while another can simultaneously be cut at a different length.

FIGS. 6 and 7 show modified forms of the front end of table 12ª and both ends of the gauge 20ª. The table in this form has an upstanding flange 80 at its front end aligned with the downwardly extending flange 16ª. In all other respects, the table 12ª is the same as table 12.

The end of the gauge 20ª mounting the extension 32 is formed with aligned slots 82 in the sides 26ª adjacent the end wall 30ª in order to accommodate the upstanding flange 80 of the table. The slots intersect the edges of the sides 26ª. The other end of the gauge 20ª mounting the bolt 42ª has its end 28ª enlarged around its opening 40ª as indicated at 84 to receive the bolt 42ª. A shaft 86 is supported across the space between the ends 26ª adjacent the top 24ª and adjacent the end wall 28ª. A plate constituting a shield 88 is pivotally mounted at one end on the shaft, depending downwardly adjacent the slots 36ª in the sides 26ª and in the path of movement of the inner end of the shank of the bolt 42ª. The shield protects the flange 14ª in the slots 26ª from damage by the inner edge of the shank of the bolt 42ª and provides a larger bearing surface for clamping against the flange 14ª thereby affording a more secure fastening of the gauge against the table.

In this form of the invention, the gauge 20ª must be slid along the flanges of the table in mounting and removing the gauge.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A gauge for work supported on a table of a cutting machine in combination with a table having downwardly and upwardly flanged front and back edges, respectively, said gauge having end structures with flange engaging means, and means associated with each flanged edge engaging means for exerting a force to drive the associated flanged edges and flanged edge-engaging means together to lock the ends of the gauge to the table, at least one end structure of the gauge having an end plate with a leg portion terminating in a hook providing a slot for receiving the associated downwardly extending flanged edge, the gauge having a vertically extending threaded opening extending through the body of the gauge, and a clamp bolt rotatively engaging the opening and movable axially against the table to move the gauge upwardly therefrom and simultaneously drive the downwardly extending flanged edge and walls of the slot against one another to lock the gauge to the table, the clamp bolt having a nut at the end thereof and a C-shaped member surrounding the nut having an opening in one part thereof to pass the bolt, the C-shaped member being freely movable on the nut and having an unbroken surface for engaging the table to prevent marring thereof.

2. A gauge for work supported on a table of a cutting machine in combination with a table having downwardly and upwardly flanged front and back edges, respectively, said gauge having a hollow body extending beyond the flanged table edges and including at least a top wall and a pair of spaced side walls, the gauge body having end structures with flanged edge engaging means, means for exerting a force to drive the associated flanged edges and flanged edge-engaging means together to lock the ends of the gauge to the table, at least one end structure including an end wall disposed between the side walls and having a threaded opening therethrough, each side wall having a slot aligned with the slot in the other side wall, the slots being adapted to receive the associated upwardly extending flanged edge of the table, a lock bolt rotatively engaging the threaded opening in the end wall and movable axially to engage the upwardly extending flange and drive it against the edge walls of the slots to lock the gauge to the table, and an inverted U-shaped transverse partition wall extending across the gauge inwardly and adjacent to the slots to provide a continuous engaging surface, for the upwardly extending flanged edge of the table.

References Cited in the file of this patent

UNITED STATES PATENTS

| | | |
|---|---|---|
| 985,682 | Landreth | Feb. 28, 1911 |
| 1,896,924 | Ulrich | Feb. 7, 1933 |
| 2,019,789 | Mahannah | Nov. 5, 1935 |
| 2,345,450 | Blanc | Mar. 28, 1944 |
| 2,491,638 | Ayers | Dec. 20, 1949 |
| 2,740,437 | Odlum et al. | Apr. 3, 1956 |